United States Patent
Chang et al.

(10) Patent No.: US 7,837,968 B2
(45) Date of Patent: Nov. 23, 2010

(54) CARBON NANOSPHERE WITH AT LEAST ONE OPENING, METHOD FOR PREPARING THE SAME, CARBON NANOSPHERE-IMPREGNATED CATALYST USING THE CARBON NANOSPHERE, AND FUEL CELL USING THE CATALYST

(75) Inventors: Hyuk Chang, Seongnam-si (KR); Chan-ho Pak, Seoul (KR); Jian Nong Wang, Shanghai (CN)

(73) Assignee: Samsung SDI Co., Ltd., Suwon (KR)

( * ) Notice: Subject to any disclaimer, the term of this patent is extended or adjusted under 35 U.S.C. 154(b) by 1329 days.

(21) Appl. No.: 11/262,812

(22) Filed: Nov. 1, 2005

(65) Prior Publication Data
US 2006/0239890 A1   Oct. 26, 2006

(30) Foreign Application Priority Data
Nov. 2, 2004   (KR) ............... 10-2004-0088218

(51) Int. Cl.
*C01B 31/00* (2006.01)
(52) U.S. Cl. .................. 423/445 R; 423/445 B; 977/734; 977/737
(58) Field of Classification Search ............ 423/445 B, 423/445 R, 447.2, 447.3, 447.4, 447.5, 447.7, 423/448, 460; 977/734, 735, 737, 842, 843, 977/847, 773, 774, 775, 788, 888
See application file for complete search history.

(56) References Cited

U.S. PATENT DOCUMENTS

| | | | | |
|---|---|---|---|---|
| 4,933,314 A | * | 6/1990 | Marumo et al. | 502/416 |
| 5,172,278 A | * | 12/1992 | Tutt | 359/885 |
| 6,009,987 A | * | 1/2000 | Siessl et al. | 191/59.1 |
| 7,270,795 B2 | * | 9/2007 | Kawakami et al. | 423/447.1 |
| 2002/0183207 A1 | * | 12/2002 | Hjortstam et al. | 505/100 |
| 2004/0045816 A1 | | 3/2004 | Masel et al. | |
| 2006/0051312 A1 | * | 3/2006 | Kim et al. | 424/76.1 |

FOREIGN PATENT DOCUMENTS

JP       08-203536        8/1996

(Continued)

OTHER PUBLICATIONS

Miao et al., "Synthesis and properties of carbon nanospheres grown by CVD using Kaolin supported transition metal catalysts, " 2004, Carbon, 42, pp. 813-822.*

(Continued)

*Primary Examiner*—Wayne Langel
*Assistant Examiner*—Brittany M Martinez
(74) *Attorney, Agent, or Firm*—H.C. Park & Associates, PLC

(57) ABSTRACT

A carbon nanosphere has at least one opening. The carbon nanosphere is obtained by preparing a carbon nanosphere and treating it with an acid to form the opening. The carbon nanosphere with at least one opening has higher utilization of a surface area and electrical conductivity and lower mass transfer resistance than a conventional carbon nanotube, thus allowing for higher current density and cell voltage with a smaller amount of metal catalyst per unit area of a fuel cell electrode.

6 Claims, 5 Drawing Sheets

FOREIGN PATENT DOCUMENTS

| | | | |
|---|---|---|---|
| JP | 2005-281065 | | 10/2005 |
| KR | 10-2003-0015593 | | 2/2003 |
| KR | 2003-0059128 | | 7/2003 |
| KR | 10-2003-0068765 | | 8/2003 |
| KR | 2003-0068765 | * | 8/2003 |
| KR | 10-2004-0011181 | | 2/2004 |
| KR | 10-2004-0014470 | | 2/2004 |
| WO | 02/29836 | | 4/2002 |

OTHER PUBLICATIONS

O'Brien et al., "Photophysics of buckminsterfullerene and other carbon cluster ions," 1988, J. Chem. Phys., vol. 88, No. 1, pp. 220-230.*

Serp et al., "Novel carbon supported material: highly dispersed platinum particles on carbon nanospheres," 2001, J. Mater. Chem., 11, pp. 1980-1981.*

Sharon et al., "Spongy Carbon Nanobeads—a New Material," 1998, Carbon, vol. 36, No. 5-6, pp. 507-511.*

Serp et al., "A chemical vapour deposition process for the production of carbon nanospheres," 2001, Carbon, 39, pp. 615-628.*

Liesbeth C. Venema, et al., Length control of individual carbon nanotubes by nanostructuring with a scanning tunneling microscope, Appl. Phys. Lett. 71 (18), Nov. 3, 1997.

Xiaoping Shui, et al., High-strength high-surface-area porous carbon made from submicron-diameter carbon filament, Unknown, Received Jan. 4, 1996; accepted in revised from Apr. 9, 1996.

Konstantin B. Shelimov, et al., Purification of single-wall carbon nanotubes by ultrasonically assisted filtration, Chemical Physics Letters vol. 282, pp. 429-434, Jan. 23, 1998.

Jie Liu, et al., Fullerene Pipes, Science, vol. 280, pp. 1253-1256, May 22, 1998.

Haoqing Hou, et al."Carbon Nanotubes Spheres Produced by Modified Ferrocene Pyrolysis", Chemistry of Materials, American Chemical Society, vol. 14, No. 9, pp. 3990-3994, Sep. 2002.

Albert G. Nasibulin, et al., "Carbon Nanotubes and Onions from Carbon Monoxide Using Ni(acac)2 and Cu(acac)2 as Catalyst Precursors", Carbon, vol. 41, No. 14, pp.2711-2724, 2003.

Yanwen MA, et al., "A Practical Route to the Production of Carbon Nanocages", Carbon, vol. 43, No. 8, pp. 1667-1672, Jul. 2005.

S. C. Tsang, et al., "A Simple Chemical Method of Opening and Filling Carbon Nanotubes", Nature, Nature Publishing Group, vol. 372, pp. 159-162, Nov. 1994.

Office Action from European Patent Office dated Dec. 10, 2009.

F. Banhart, et al., "The migration of metal atoms through carbon onions", Chemical Physics Letter, Aug. 14, 1998, pp. 554-560, vol. 292, Elsevier Science B.V.

The Registration Determination Certificate of CN 1781843 corresponding to U.S. Appl. No. 11/262,812 was issued on Jun. 9, 2010.

* cited by examiner

CARBON NANOSPHERE WITH AT LEAST ONE OPENING, METHOD FOR PREPARING THE SAME, CARBON NANOSPHERE-IMPREGNATED CATALYST USING THE CARBON NANOSPHERE, AND FUEL CELL USING THE CATALYST

CROSS-REFERENCE TO RELATED PATENT APPLICATIONS

This application claims priority to and the benefit of Korean Patent Application No. 10-2004-0088218, filed on Nov. 2, 2004 in the Korean Intellectual Property Office, the disclosure of which is incorporated herein in its entirety by reference.

BACKGROUND OF THE INVENTION

1. Field of the Invention

The present invention relates to a carbon nanosphere with at least one opening, a method of preparing the same, a supported catalyst, and a fuel cell, comprising the same. In particular, the invention relates to a carbon nanosphere with at least one opening, a method of preparing the same, a supported catalyst in which metal catalyst particles are supported on the carbon nanosphere with at least one opening, and a fuel cell that uses the supported catalyst.

2. Description of the Related Art

Fuel cells are clean energy sources that have received considerable interest as fossil fuels alternatives. A fuel cell is a power generating system that produces direct current electricity through an electrochemical reaction between fuel such as hydrogen, natural gas, or methanol and an oxidizing agent.

In general, a fuel cell includes an anode (fuel electrode) where a supplied fuel is oxidized, a cathode (air electrode) where the oxidizing agent is reduced, and an electrolyte membrane that is interposed between the anode and the cathode and provides a path for transporting ions that are produced at the anode to the cathode. Electrons are generated through the oxidation of the fuel at the anode, which then flow via an external circuit and are returned to the cathode to reduce the oxidizing agent.

Among the most important features of the fuel cell are catalysts that are present at the anode and the cathode to catalyze the reactions that occur at the electrodes. Thus, many experiments have been conducted to increase the activity of the catalysts used in the electrodes. The catalytic activity increases as the reaction surface area of the catalyst increases, and thus, the reaction surface area may be increased by decreasing the particle diameter of the catalyst to uniformly distribute the catalyst on the electrodes.

Conventionally, a platinum (Pt) catalyst, for example, is applied to a carbon cloth, etc. However, the catalyst cannot be uniformly dispersed on the carbon and the surface area and electrical conductivity of the carbon support, etc., are not sufficiently high.

A metal catalyst that is supported on porous carbon powders has been suggested. The specific surface area of the porous carbon powders can be controlled such that the ability to impregnate a catalyst is high. However, when the carbon powders are graphited or crystallized to increase the electrical conductivity, the structures of the carbon powders are altered. In addition, the electrical conductivity cannot be increased sufficiently. Thus, the surface properties of the carbon powders must be improved.

In order to overcome these problems, the use of carbon nanotubes or nanohorns as supports has been suggested and a significant amount of research has been done in this area.

Carbon nanotubes are very fine cylindrical materials that have a diameter of about several nm to about several tens of nm, a length of about several µm to about several hundreds of µm, high anisotropy, and come in various structures and shapes such as single-walled, multi-walled, or rope shapes. In carbon nanotubes, one carbon atom bonds to three other carbon atoms to form a hexagonal honeycomb (a pentagonal or heptagonal honeycomb may be formed depending on the curvature radius at the bounding position of the carbon atom). Carbon nanotubes may have metallic or semiconductor properties depending on their structures, are mechanically strong (about 100 times stronger than steel), have chemical stability, high thermal conductivity, and a hollow structure. Thus, carbon nanotubes may be used in various microscopic and macroscopic applications, such as catalyst carriers.

Carbon nanotubes have high electrical conductivity and thus, can increase the utilization of the electrical energy that is generated during an electrochemical reaction. However, a catalyst can be supported only on the outer walls of carbon nanotubes and the surface area on which the catalyst can be substantially supported is small, relative to the total surface area of the carbon nanotubes. That is, the capability to impregnate a catalyst is low. Further, when the carbon nanotubes have a high aspect ratio, they cannot be uniformly dispersed easily on the surface of an electrode during formation of the electrode. In particular, the diffusion resistance of the material is high due to the closed structures of their ends, which is one of the largest obstacles to their use as a catalyst carrier.

In order to overcome the problems, the use of carbon nanohorns has been suggested. Carbon nanohorns have a conical structure, similar to ends of nanotubes that are cut off from the nanotubes. The carbon nanohorns are very short and a catalyst can be impregnated even in their innermost regions. However, carbon nanohorns have an internal diameter of about 1 nm and the optimal particle size of the catalyst is about 2-3 nm. Thus, the catalyst cannot be sufficiently supported on the carbon nanohorns. In this case, the catalyst is supported only on the outer walls of the nanohorns and the advantage of the high surface area of the nanohorns is lost. Further, a nanohorn has one closed end, and thus, when nanohorns are used as catalyst supports, a fuel cannot flow smoothly, resulting in a low catalytic efficiency.

In order to overcome these problems, the use of short carbon nanotubes that have open ends has been suggested. However, since the carbon nanotubes are flexible and resistant to an applied stress, short carbon nanotubes that have open ends cannot be prepared easily.

Methods for cutting a carbon nanotube in order to prepare a short carbon nanotube that has open ends have been suggested. One method includes using ultrasonic waves (K. L. Lu et al., *Carbon* 34, 814-816 (1996); K. B. Shelimov et al., *Chem. Phys. Lett.* 282, 429-434 (1998); J. Liu et al., *Science* 280, 1253-1256 (1998)). However, the resulting short carbon nanotubes have a low yield and an inconsistent relative length. Another method includes using an STM voltage (L. C. Venema et al., *Appl. Phys. Lett.* 71, 2629-2631 (1999)). In this method, the resulting short carbon nanotubes do not have open ends. An additional method includes using ball milling, but short carbon nanotubes that have both ends open cannot be produced.

A conventional carbon nanotube can be processed into a short carbon nanotube with both ends open by a mechanical or chemical treatment, but the processing cannot be performed easily due to a strong binding force between crystalline carbons.

SUMMARY OF THE INVENTION

The present invention provides a carbon nanosphere that has at least one opening that has a higher surface area utilization, higher electrical conductivity, and lower mass transfer resistance than a conventional carbon nanosphere or carbon nanotube. This allows for higher current density and cell voltage with a smaller amount of metal catalyst per unit area of a fuel cell electrode.

The present invention also provides a method for preparing the carbon nanosphere with at least one opening in a simple and efficient manner.

Additional features of the invention will be set forth in the description which follows, and in part will be apparent from the description, or may be learned by practice of the invention.

The present invention discloses a carbon nanosphere with at least one opening.

The present invention also discloses a method for preparing a carbon nanosphere with at least one opening comprising heating an organic metal compound in a preheating region, heating the resulting organic metal compound, a dilution gas, and a hydrocarbon gas in a reaction furnace to grow a carbon nanosphere, and treating the resulting carbon nanosphere with an acid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
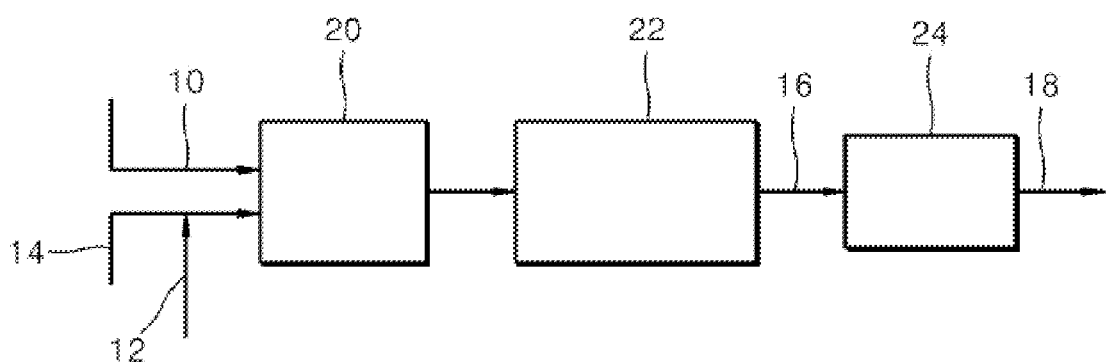
FIG. 1 is a flow chart for a method of preparing a carbon nanosphere with at least one opening according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

According to an exemplary embodiment of the present invention, a method for preparing a carbon nanosphere that has at least one opening is provided. In this method, a carbon nanosphere is prepared using any workable method, and then the obtained carbon nanosphere is treated with an acid to form the opening. In order to obtain the carbon nanosphere with a desired diameter and wall thickness, ratios of flow rates of supplied reactants may be controlled.

Methods for preparing a carbon nanosphere may include, but are not limited to arc discharge, laser vaporization, thermochemical vapor deposition, and plasma enhanced chemical vapor deposition, etc.

When using the arc discharge method and the laser vaporization method, the yield of carbon nanotubes is relatively low. In addition, a large number of amorphous phase carbon clusters are produced along with the carbon nanotube, which requires a complicated purifying process. It is also difficult to grow a large amount of carbon nanotubes on a substrate with a large area.

Chemical vapor deposition produces vertically arranged carbon nanotubes that can be synthesized at a high purity and a high yield. However, it is very difficult to control the diameter and length of a carbon nanotube. The length of the carbon nanotube is about several μm to several tens of μm, which is not suitable for a catalyst carrier.

Accordingly, in order to prepare a carbon nanosphere using the conventional chemical vapor deposition method, operation parameters must be altered. For example, the growth temperature is lowered and the residence time is reduced.

When the growth temperature of the carbon nanosphere is low, an organic metal compound used as a reactant in preparing the carbon nanosphere may decompose at a relatively low temperature. For example, the organic metal compound may be copper tartrate. The copper tartrate includes a monovalent copper compound ($Cu_2C_4H_4O_6$) and a divalent copper compound ($CuC_4H_4O_6$), i.e., copper (II) tartrate. In many cases, an organic metal compound such as copper (II) tartrate is generally present in the form of a hydrated salt. Copper (II) tartrate may include DL-tartrate and L-tartrate, which are dihydrated salts, and mesotartrate, which is a trihydrated salt.

Referring to FIG. 1, an organic metal compound 10 is preheated in a preheating region 20 to evaporate hydrated water molecules. Another purpose of the preheating is to control the size of the copper nanoparticles or copper nanospheres by adjusting the growth temperature and the residence time. The temperature of the preheating region 20 molecules may be about 100° C. to about 200° C. If the temperature in the preheating region 20 is less than 100° C., the crystalline water molecules, i.e., the hydrated water molecules cannot evaporate sufficiently. If the temperature in the preheating region 20 is greater than about 200° C., the organic metal compound 10 may decompose excessively, thereby forming larger metal particles.

The residence time of the organic metal compound 10 in the preheating region 20 may be about 20 minutes to about 40 minutes. If the residence time is less than about 20 minutes, the crystalline water molecules, i.e., the hydrated water molecules, cannot evaporate sufficiently. If the residence time is greater than about 40 minutes, the organic metal compound 10 may decompose completely, and thus the metal in the organic metal compound 10 may form into particles.

Water molecules thus evaporated in the preheating region 20 may be removed using a water removal unit such as a cooling condenser.

The organic metal compound 10 from which water was removed in the preheating region 20, a dilution gas 12, and a hydrocarbon gas 14 are transferred to a reaction furnace 22, in which a reaction for generating a carbon nanosphere 16 is performed. The hydrocarbon gas 14 may be any hydrocarbon gas that is used in preparing carbon nanotubes such as methane, ethylene, or acetylene ($C_2H_2$). The dilution gas 12 may be nitrogen. In the reaction furnace 22, the hydrocarbon gas 14 is thermally decomposed by the copper nanoparticle to form the carbon nanosphere 16.

The temperature in the reaction furnace 22 may be about 450° C. to about 600° C. If the temperature in the reaction furnace 22 is less than about 450° C., the metal cannot be completely decomposed from the organic metal compound 10, thus preventing catalytic action. Further, the decomposition of carbon is too slow, and so the structure of the carbon nanosphere 16 cannot be formed completely. If the temperature in the reaction furnace 22 is greater than about 600° C., the decomposition of carbon occurs too quickly and the number of walls of the carbon nanosphere 16 increases, resulting in an excessively thick carbon nanosphere, although the crystallinity increases.

The mean residence time of the above reactants in the reaction furnace 22 may be about 20 to about 40 minutes. If the mean residence time in the reaction furnace 22 is less than about 20 minutes, the structure of the carbon nanosphere 16 cannot be formed completely. If the mean residence time in the reaction furnace 22 is greater than about 40 minutes, the number of walls of the carbon nanosphere 16 increases, resulting in an excessively thick carbon nanosphere.

Since the residence time of the reactants in the reaction furnace 22 is shorter than the residence time in the conventional method as described above, defects are generated in C—C bonds in the carbon nanosphere 16. Defects are generated because the environments in which the carbon nanosphere 16 is grown change rapidly as the carbon nanosphere 16 passes through the preheating region 20 and the heating furnace 22. Thus, crystals with a constant size cannot be formed.

Although some of the defects may be opened during the growth of the carbon nanosphere 16, most of the defects are generally opened by treating the carbon nanosphere 16 with a strong acid to oxidize the defective portions. There may be about one, two, three or more defects. When one defect is present in the carbon nanosphere 16, after the defect is oxidized, the carbon nanosphere 16 is in the shape of a pot with an open hole. When two defects are present in the carbon nanosphere 16, after the defects are oxidized, the carbon nanosphere 16 is in the shape of a short tube with an expanded middle portion.

When one opening is present in the carbon nanosphere 16, a flow entering the carbon nanosphere 16 and a flow exiting the carbon nanosphere 16 share the same space, thus, mass transfer may be less than when at least two openings are present. However, since only a small portion of the total carbon nanospheres 16 have only one opening, the presence of carbon nanospheres with only one opening does not have a decisive effect on the overall physical properties of the carbon nanospheres 16.

As described above, in order to obtain a carbon nanosphere 16 that has a desired diameter and wall thickness, the ratios of the flow rates of reactants must be suitably controlled.

The molar flow rate of the hydrocarbon gas 14 may be about 0.0006 to about 0.0025 times the molar flow rate of the dilution gas 12. If the molar flow rate of the hydrocarbon gas 14 is less than about 0.0006 times the molar flow rate of the dilution gas 12, the amount of the carbon required to form the structure of the carbon nanosphere 16 is insufficient, and thus the desired carbon nanosphere 16 cannot be formed completely. If the molar flow rate of the hydrocarbon gas 14 is greater than about 0.0025 times the molar flow rate of the dilution gas 12, too much carbon is decomposed, and the wall thickness of the carbon nanosphere 16 may be too thick.

The amount and the structure of the carbon nanosphere 16 that is formed depend on the flow rates of the dilution gas 12 and the hydrocarbon gas 14 and the residence time in the reaction furnace 22, regardless of the concentration of the organic metal compound that is 10 used, as long as there is a specific minimum amount of the organic metal compound 10. That is, when a sufficient amount of the organic metal compound 10 is present in the reaction furnace 22, the amount and the structure of the carbon nanosphere 16 that is formed depends mainly on the flow rates of the dilution gas 12 and the hydrocarbon gas 14 and the residence time in the reaction furnace 22. Thus, a sufficient amount of the organic metal compound 10 may be introduced into the reaction furnace 22 before starting the reaction. The reaction may end when a residual amount of the organic metal compound 10 falls to less than the required minimum amount due to consumption during the reaction. Alternatively, an excess amount of the organic metal compound 10 may be introduced into the reaction furnace 22 together with the other reactants.

When the organic metal compound 10 is copper tartrate, the required minimum concentration is 12.5 g of copper tartrate per gram of carbon nanosphere 16 formed. Thus, when the copper tartrate is to be introduced into the reaction furnace 22 before starting the reaction, the weight of the copper tartrate must be at least 12.5 times the weight of the carbon nanosphere 16 to be formed. When an excess of the copper tartrate is introduced into the reaction furnace 22 with the other reactants, the flow rate of the copper tartrate must be at least 12.5 times the formation rate of the carbon nanosphere 16.

The concentration of the copper tartrate supplied may be about 12.5 g to about 100 g per gram of the carbon nanosphere 16 formed. If the concentration of the copper tartrate supplied is less than about 12.5 g per gram of the carbon nanosphere 16 formed, a carbon nanosphere with the desired structure cannot be obtained. If the concentration of the copper tartrate supplied is greater than about 100 g per gram of the carbon nanosphere 16 formed, the size of the reaction furnace 22 should be increased and production costs may increase.

Since the carbon nanosphere 16 obtained in the reaction furnace 22 does not have an opening, it has a small surface area, a high mass transfer resistance, and cannot impregnate many metal catalyst particles. In order to form opening son a surface of the carbon nanosphere 16, the carbon nanosphere 16 must be treated with a strong acid in the acid treatment region 24. When the carbon nanosphere 16 is treated with the acid, defects are first oxidized, thereby forming openings on the surface of the carbon nanosphere 16. As a result, a carbon nanosphere 18 with at least one opening is obtained. The acid may include, but is not limited to nitric acid.

A carbon nanosphere with at least one opening may be prepared using the method as described in the previous embodiment. The carbon nanosphere may have openings all over its surface and a diameter of about 100 nm to about 350 nm and a wall thickness of about 5 nm to about 30 nm. Each of the openings may have a diameter of about 5 nm or greater, particularly about 5 to about 150 nm.

If the diameter of the carbon nanosphere with at least one opening is less than about 100 nm, a space into which the catalyst may penetrate is too small, thereby decreasing the utilization of the catalyst. If the diameter of the carbon nanosphere that has at least one opening is greater than about 350 nm, the specific surface area is decreased and the carbon nanosphere may not effectively function as a catalyst carrier.

If the wall of the carbon nanosphere with at least one opening is less than about 5 nm thick, the mechanical strength is not sufficient. If the wall of the carbon nanosphere with at least one opening is greater than about 30 nm thick, the openings cannot be formed easily.

If the diameter of each of the openings is less than about 5 nm, the catalyst particles may not easily enter the openings of the carbon nanosphere and may not be uniformly distributed in the inside and outside of the carbon nanosphere. Further, good mass transfer is not attained, thereby decreasing the catalytic efficiency. If the diameter of each of the openings is greater than about 150 nm, the specific surface area decreases and the carbon nanosphere may not effectively function as a catalyst carrier.

The metal catalyst may be supported on the carbon nanosphere that has at least one opening using any workable method. The metal catalyst particles to be supported may have an average particle size of about 2 nm to about 5 nm. If the average particle size of the metal catalyst particles is less than about 2 nm, the metal catalyst particles cannot sufficiently provide an active site for the catalytic reaction. If the average particle size of the metal catalyst particles is greater than about 5 nm, the specific surface area decreases, thereby reducing the catalytic efficiency.

The metal catalyst particles used in the carbon nanosphere-supported catalyst are not specifically limited, but may include platinum (Pt) or a Pt alloy when the supported catalyst is used in a proton exchange membrane fuel cell (PEMFC) or a direct methanol fuel cell (DMFC). The Pt alloy may include Ti, Cr, Mn, Fe, Co, Ni, Cu, Ga, Zr, Hf, Ru, Ir, Rh, Pd, Os, or a mixture thereof. In the DMFC, methanol is oxidized to generate carbon monoxide, which causes poisoning of a Pt catalyst. To prevent this poisoning, the Pt alloy catalyst may be used.

The carbon nanosphere-supported catalyst may be used as an active component in a fuel cell electrode. The electrode for the fuel cell may be prepared using any workable method. For example, the carbon nanosphere-impregnated catalyst may be dispersed in a solution of an ionomer such as Nafion® and then combined with isopropyl alcohol to prepare a slurry. The slurry is coated on a waterproof carbon paper using spray coating and then dried to obtain the electrode.

A fuel cell according to an exemplary embodiment of the present invention may be a PEMFC, a DMFC, etc. Fuel cells may be classified into alkaline, phosphoric acid, molten carbonate, solid oxide, and solid polymer electrolyte fuel cells depending on the type of electrolyte used. In particular, when a Pt catalyst is used, the carbon nanosphere-supported catalyst is suitable for alkaline, phosphoric acid, and solid polymer electrolyte fuel cells. Since the DMFC has the same structure as the solid polymer electrolyte fuel cell, the carbon nanosphere-supported catalyst may also be used in the DMFC. Since a liquid fuel may diffuse efficiently through the inside of the carbon nanosphere that has at least one opening, the carbon nanosphere-supported catalyst is particularly suitable for the DMFC.

Hereinafter, the present invention will be described in more detail with reference to the following examples. However, these examples are given for the purpose of illustration and are not intended to limit the scope of the invention.

EXAMPLES 1-3

A reaction furnace was purged with a dilution gas at a volumetric flow rate of 500 standard cubic centimeters per minute (sccm) under atmospheric pressure while the temperature of the reaction furnace was elevated to the temperatures listed in Table 1. Copper tartrate ($CuC_4H_4O_6 \cdot H_2O$) was used as an organic metal compound and acetylene was used as a hydrocarbon gas to form carbon nanospheres. The flow rate of the dilution gas was 16 L/min and the resulting carbon nanospheres were treated with nitric acid to obtain carbon nanospheres that have at least one opening. The reaction conditions of Examples 1-3 are shown in Table 1.

TABLE 1

| | Temperature (° C.) | | Residence Time (min) | | Ramp rate (° C./min) | Flow rate of hydrocarbon gas (ml/min) | Dilution gas |
| --- | --- | --- | --- | --- | --- | --- | --- |
| | Preheating region | Reaction furnace | Preheating region | Reaction furnace | | | |
| Example 1 | 200 | 450 | 20 | 30 | 12.5 | 10 | Argon |
| Example 2 | 150 | 500 | 30 | 20 | 17.5 | 30 | Nitrogen |
| Example 3 | 100 | 600 | 40 | 30 | 20 | 20 | Nitrogen |

The carbon nanospheres that have at least one opening that were prepared under the conditions described in Table 1 exhibited the physical properties listed in Table 2.

TABLE 2

| | Diameter of carbon nanosphere (nm) | Wall thickness (nm) |
| --- | --- | --- |
| Example 1 | 200 | 10 |
| Example 2 | 250 | 25 |
| Example 3 | 300 | 20 |

Figure 2A:
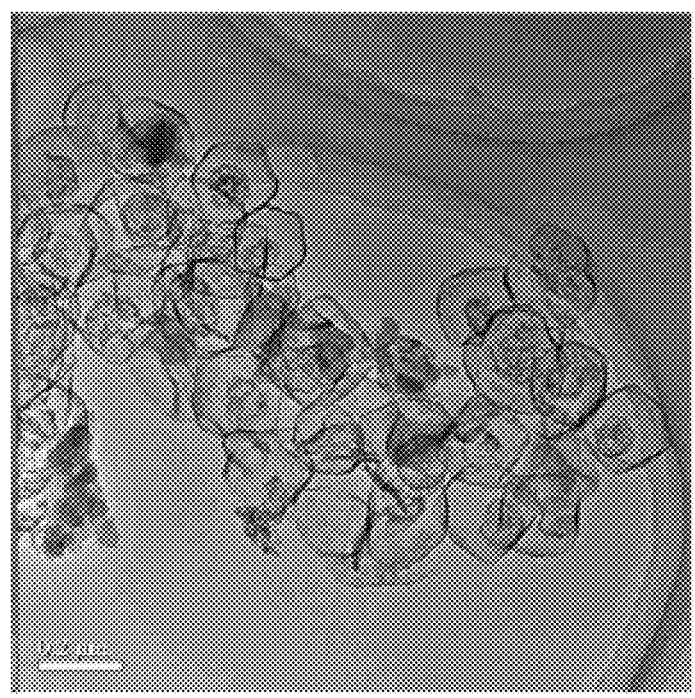
FIG. 2A, FIG. 2B, FIG. 3A and FIG. 3B are transmission electron microscopic (TEM) photos of carbon nanospheres that have at least one opening according to an embodiment of the present invention.
Figure 2B:
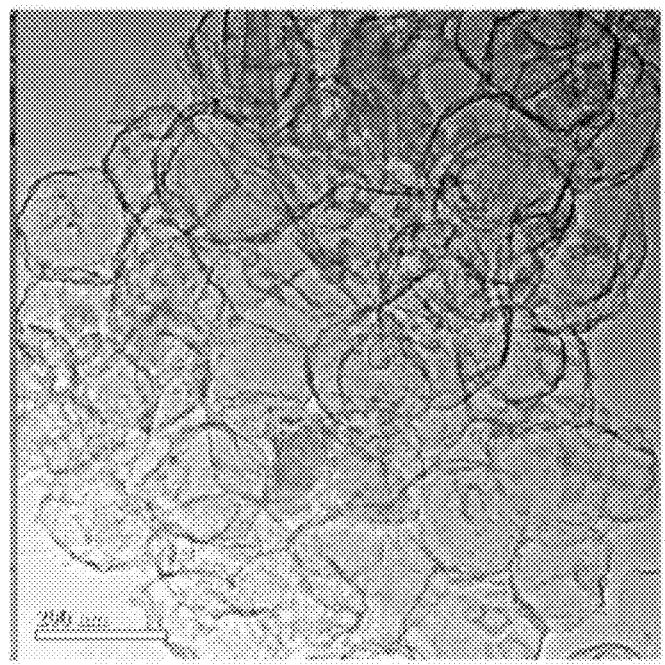

FIG. 2A and FIG. 2B are transmission electron microscopic (TEM) photos of the carbon nanospheres obtained in Examples 1-3. It was confirmed from FIG. 2A and FIG. 2B that each of the obtained carbon nanospheres had openings.

EXAMPLES 4 and 5

In order to confirm the effects of the reaction conditions on the shape of carbon nanosphere, experiments were preformed by changing the reaction conditions. Copper tartrate ($CuC_4H_4O_6 \cdot H_2O$) was used as an organic metal compound and acetylene was used as a hydrocarbon gas. The flow rate of the dilution gas was 16 L/min and the resulting carbon nanospheres were treated with nitric acid. The reaction conditions of Examples 4 and 5 are shown in Table 3.

TABLE 3

| | Temperature (° C.) | | Residence Time (min) | | Ramp rate (° C./min) | Flow rate of hydrocarbon gas (ml/min) | Dilution gas |
|---|---|---|---|---|---|---|---|
| | Preheating region | Reaction furnace | Preheating region | Reaction furnace | | | |
| Example 4 | 150 | 700 | 30 | 30 | 15.7 | 40 | Argon |
| Example 5 | 100 | 750 | 40 | 30 | 16.3 | 25 | Nitrogen |

The carbon nanospheres with at least one opening that were prepared under the conditions described in Table 3 exhibited the physical properties listed in Table 4.

TABLE 4

| | Diameter of carbon nanosphere (nm) | Wall thickness (nm) |
|---|---|---|
| Example 4 | 500 | 35 |
| Example 5 | 600 | 30 |

Figure 3A:
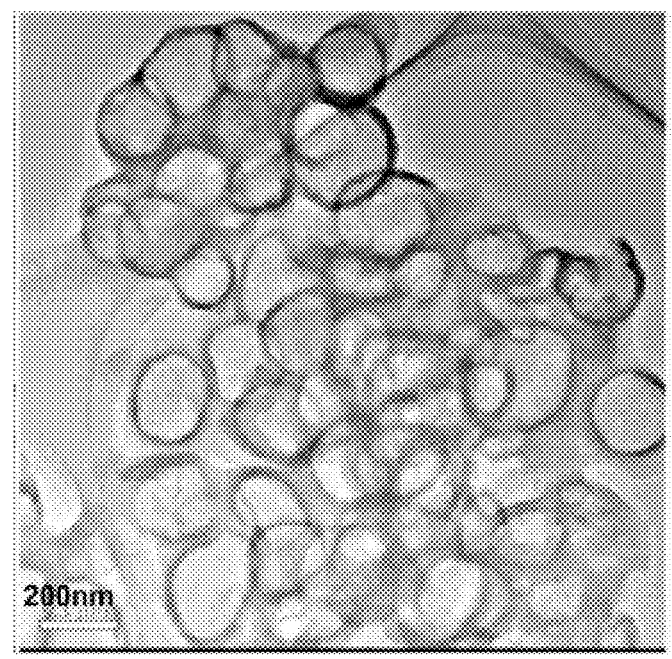
Figure 3B:
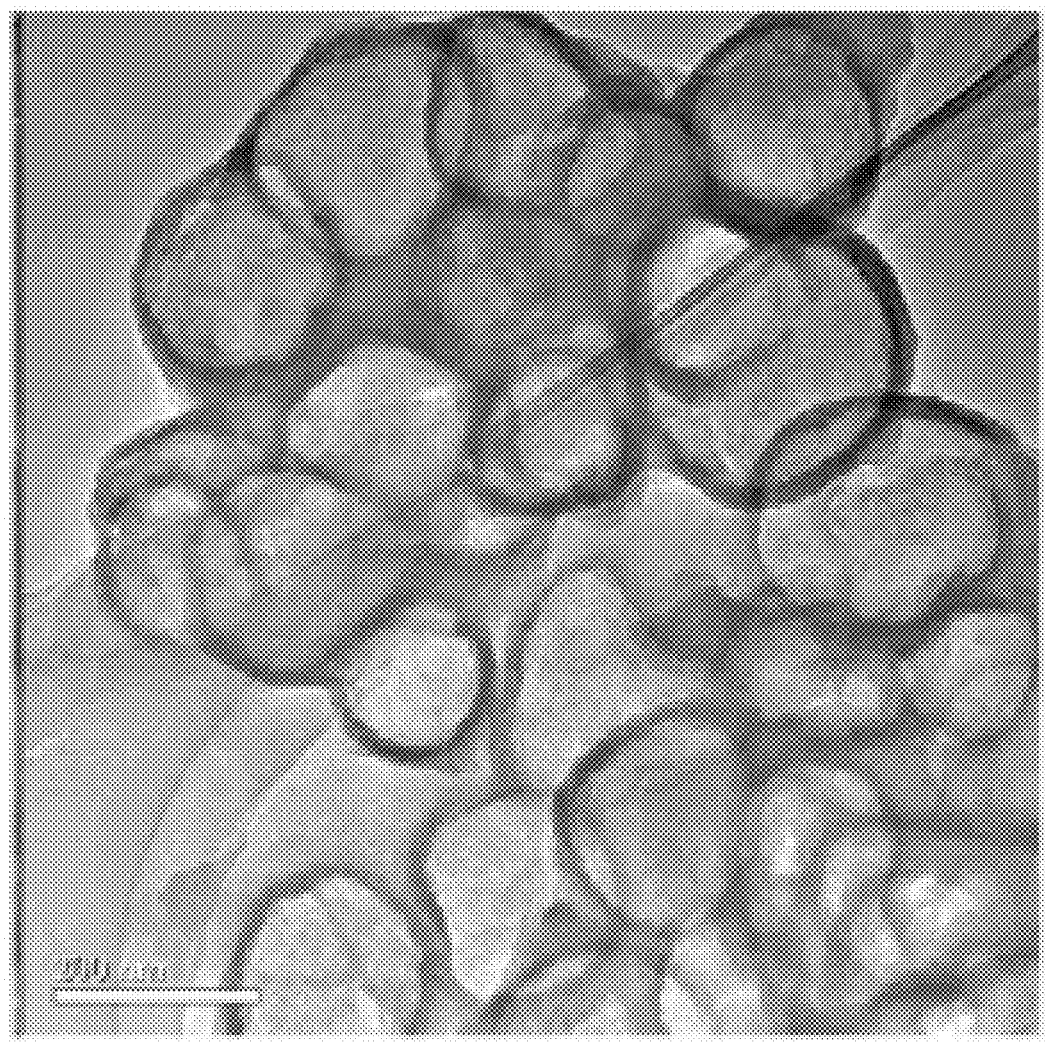

FIG. 3A and FIG. 3B are TEM photos of the carbon nanospheres of Example 4 and Example 5, respectively. The resulting carbon nanospheres had openings, but the openings were insufficiently formed relative to the openings in the carbon nanospheres obtained in Examples 1-3.

Specifically, it was confirmed from the results in Table 2 and Table 4 that the carbon nanospheres obtained in Examples 1-3 had smaller wall thicknesses than the carbon nanospheres obtained in Examples 4 and 5. When the wall thickness is small, the openings can be well-formed during the acid treatment. Since the carbon nanospheres obtained in Examples 1-3 had thinner walls than the carbon nanospheres obtained in Examples 4 and 5, it was expected that the carbon nanospheres obtained in Examples 1-3 had more openings than the carbon nanospheres obtained in Examples 4 and 5.

It was confirmed from the TEM photos in FIG. 2A, FIG. 2B, FIG. 3A and FIG. 3B that the openings were sufficiently formed in the carbon nanospheres obtained in Examples 1-3, while the openings were less formed in the carbon nanospheres obtained in Examples 4 and 5. Thus, it is believed that whether the openings are well formed or not depends on the temperature in the reaction furnace, the residence time, and/or the ratios of flow rates of the reactants.

EXAMPLE 6

0.5 g of the carbon nanosphere with at least one opening obtained in Example 1 as a carbon support was placed in a plastic bag, and then 1.9236 g of $H_2PtCl_6$ was dissolved in 1.5 mL of acetone in a beaker. The acetone solution was mixed with the carbon carrier in the plastic bag. The mixture was dried in air for 4 hours, and was then transferred to a crucible and dried in a drier at 60° C. overnight. Then, the crucible was placed in an electric furnace under nitrogen flow for 10 minutes. Next, nitrogen gas was replaced with hydrogen gas and the temperature in the electric furnace was raised from room temperature to 200° C. and maintained for 2 hours to reduce a Pt salt that was impregnated on the carbon support. The hydrogen gas was replaced with nitrogen gas and the temperature in the electric furnace was raised to 250° C. at a rate of 5° C./min and maintained at 250° C. for 5 hours, and then cooled to room temperature. Thus, a carbon nanosphere-supported catalyst with a loading of 60 wt % of Pt was obtained.

Figure 4:
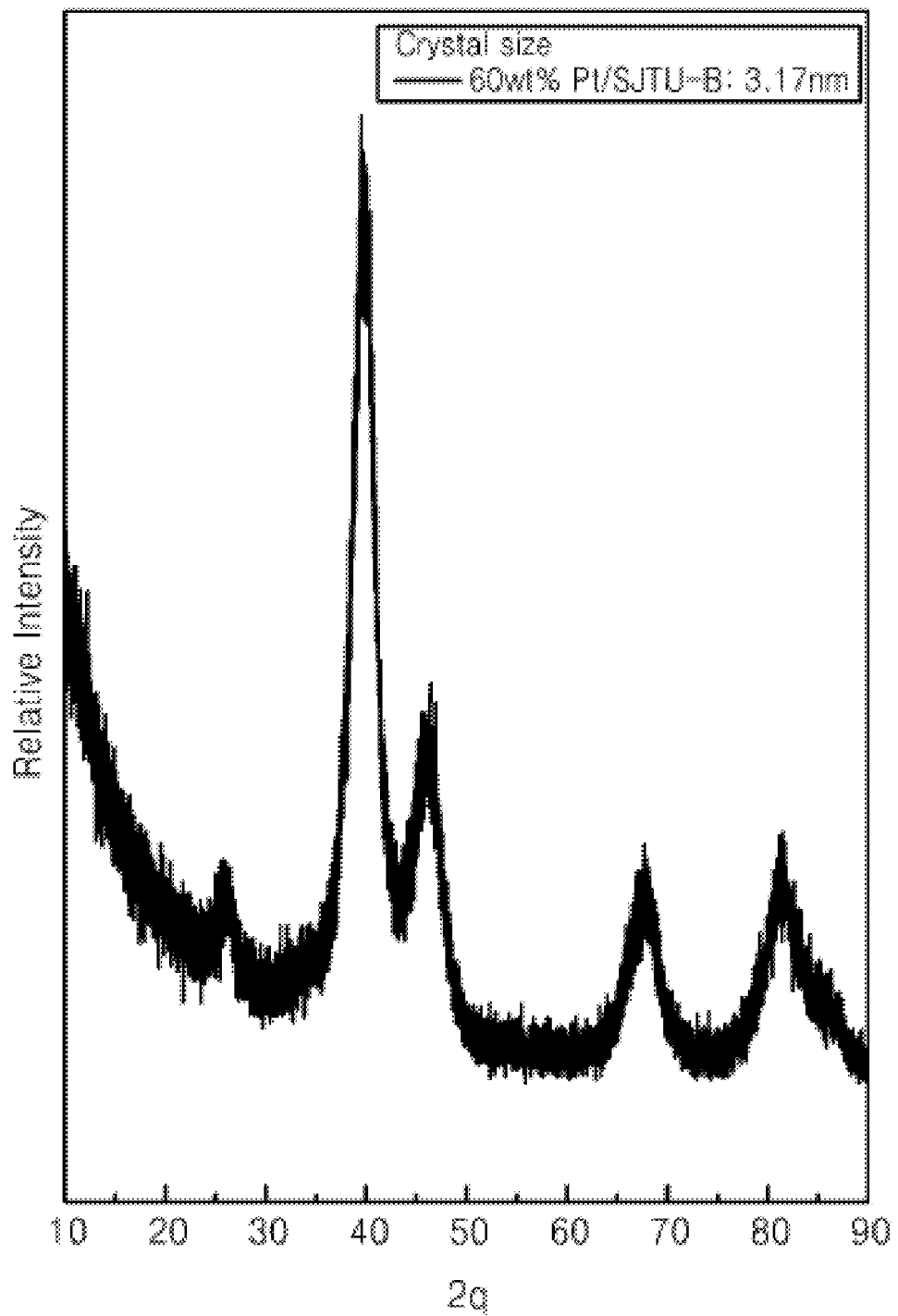
FIG. 4 is an X-ray diffraction (XRD) graph of a metal catalyst supported on a carbon nanosphere that has at least one opening according to an exemplary embodiment of the present invention.

An X-ray diffraction (XRD) graph for the obtained carbon nanosphere-supported catalyst is shown in FIG. 4. An average particle size of the metal particles impregnated on the support was 3.2 nm.

Preparation of a Fuel Cell

The carbon nanosphere-supported catalyst prepared in Example 6 was dispersed in a dispersion of Nafion 115® (DuPont) in isopropyl alcohol to prepare a slurry. The slurry was coated on a carbon electrode using a spray process to obtain 1 mg/cm² of the coated catalyst based on a Pt loading. Then, the electrode was passed through a rolling machine to enhance adhesion between the catalyst layer and the carbon paper, thereby obtaining a cathode. An anode was prepared using a commercially available PtRu Black catalyst and a unit cell was prepared using the cathode and the anode.

Performance Test of the Unit Cell

Figure 5:
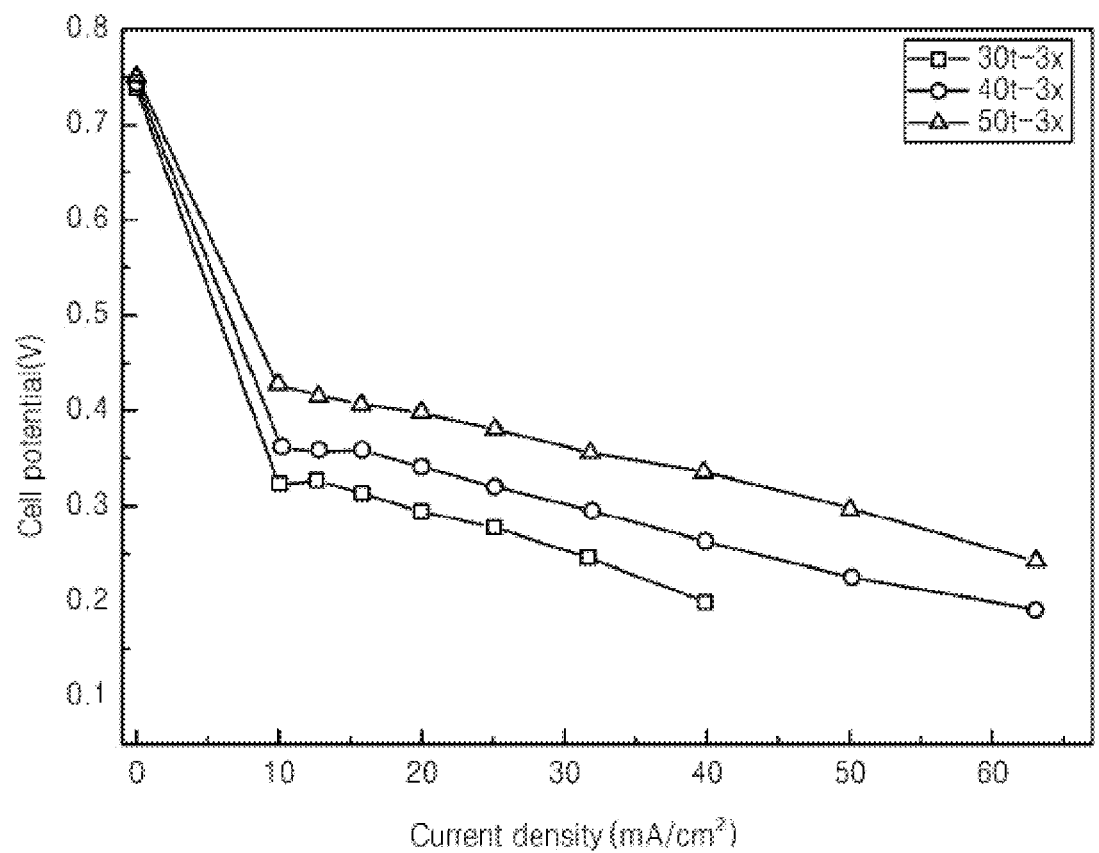
FIG. 5 is a graph of current density vs. cell potential for a fuel cell according to an exemplary embodiment of the present invention.

The performance of the unit cell obtained above was measured at 30° C., 40° C., and 50° C. while supplying 1 M methanol and air. The results are shown in FIG. 5. Although the fuel cell according to the present invention used the catalyst in a concentration of 1 mg/cm² or less, it had the equivalent or better performance when compared to a conventional fuel cell that uses a catalyst per unit area in a concentration of 2-4 mg/cm².

As described above, a carbon nanosphere with at least one opening according to the present invention has a higher utilization of surface area and electrical conductivity and lower mass transfer resistance than a conventional carbon nanosphere or carbon nanotube, thus allowing for higher current density and cell voltage with a smaller amount of metal catalyst per unit area of a fuel cell electrode.

Further, the method for preparing a carbon nanosphere with at least one opening according to the present invention provides a simpler and more efficient method than a conventional method.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A carbon nanosphere having at least one opening, and having a diameter of about 100 nm to about 350 nm and a thickness of about 5 nm to about 30 nm.

2. The carbon nanosphere of claim 1, wherein the opening has a diameter of 5 nm or greater.

3. The carbon nanosphere of claim 1, wherein the opening has a diameter of 5 nm to 150 nm.

4. A carbon nanosphere having at least one opening, wherein the opening has a diameter of 5 nm or greater, and wherein the carbon nanosphere has a thickness of about 5 nm to about 30 nm.

5. The carbon nanosphere of claim 4, having a diameter of about 100 nm to about 350 nm.

6. The carbon nanosphere of claim 4, wherein the opening has a diameter of 5 nm to 150 nm.

* * * * *